US009052990B2

(12) United States Patent
Maria Joseph et al.

(10) Patent No.: US 9,052,990 B2
(45) Date of Patent: Jun. 9, 2015

(54) TECHNIQUES FOR MANAGING PINNED MEMORY

(71) Applicant: INTERNATIONAL BUSINESS MACHINES CORPORATION, Armonk, NY (US)

(72) Inventors: Frederic Durairaj Maria Joseph, Tamilnadu (IN); Keerthi B. Kumar, Bangalore (IN); Vishal R. Mansur, Karnataka (IN); Chetan L. Gaonkar, Uttar Kannada (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/681,585

(22) Filed: Nov. 20, 2012

(65) Prior Publication Data

US 2014/0143507 A1   May 22, 2014

(51) Int. Cl.
  *G06F 12/00* (2006.01)
  *G06F 12/06* (2006.01)
  *G06F 12/02* (2006.01)
  *G06F 3/06* (2006.01)

(52) U.S. Cl.
  CPC ............ *G06F 12/00* (2013.01); *G06F 12/0646* (2013.01); *G06F 12/02* (2013.01); *G06F 12/023* (2013.01); *G06F 3/0617* (2013.01); *G06F 3/0644* (2013.01)

(58) Field of Classification Search
  None
  See application file for complete search history.

(56) References Cited

U.S. PATENT DOCUMENTS

2003/0101324 A1*  5/2003  Herr et al. .................... 711/170
2012/0005448 A1   1/2012  Accadadi et al.

\* cited by examiner

*Primary Examiner* — Midys Rojas
(74) *Attorney, Agent, or Firm* — Yudell Isidore PLLC; Parashos Kalaitzis

(57) ABSTRACT

A technique for managing pinned memory in a data processing system includes determining whether a first loadable module is completely utilizing pinned memory assigned to the first loadable module. In response to determining the first loadable module is not completely utilizing the pinned memory assigned to the first loadable module, the pinned memory that is not being utilized by the first loadable module is converted to kernel lock memory. In response to a second loadable module requesting pinned memory and non-kernel lock memory not being available to meet the request, one or more pages of the kernel lock memory are assigned to the second loadable module. In response to the second loadable module requesting the pinned memory and the non-kernel lock memory being available to meet the request, one or more pages of the non-kernel lock memory are assigned to the second loadable module.

20 Claims, 9 Drawing Sheets

Allocation Record Table

| Loadable Module Identifier/Name | |
|---|---|
| Effective Address | Length (in pages) |
| FFFF_1100 | 3 |
| FFFF_6200 | 3 |
| ---- | ---- |

FIG. 2

Pinned Usage Record Table 400

| Loadable Module Identifier/Name | Effective Addresses Used | Effective Addresses Free | Age |
|---|---|---|---|
| | FFFF_1100 | FFFF_3100 | 2 |
| | FFFF_2100 | FFFF_7200 | 0 |
| | FFFF_6200 | FFFF_8200 | 2 |

*FIG. 4*

Page Frame Table

| Page Starting at Effective Address | Page Status |
|---|---|
| FFFF_3100 | Pinned:1->0<br>Klock:0->1 |
| FFFF_7200 | Pinned:1->0<br>Klock:0->1 |
| FFFF_8200 | Pinned:1->0<br>Klock:0->1 |

FIG. 5

TECHNIQUES FOR MANAGING PINNED MEMORY

BACKGROUND

This disclosure relates generally to pinned memory and, more particularly, to techniques for managing pinned memory in a data processing system.

In computer systems, memory management units (MMUs) may be configured to employ paging to store and retrieve data from secondary storage for use in primary storage. In a known memory management approach, a pager (e.g., implemented within an MMU) retrieves data from secondary storage in blocks, referred to as pages. In virtual memory implementations, paging allows an OS to use secondary storage for data that does not fit into primary storage. When an executing program tries to access pages that are not currently mapped to primary storage, a page fault occurs, and an MMU attempts to handle the page fault in a manner that is invisible to the executing program. For example, an MMU may: determine a location of requested data in secondary storage; obtain an available page frame in primary storage for the requested data; load the requested data into the available page frame in the primary storage; update a page table (PT) to show where the new data is located; and return control to the executing program to transparently retry the instruction that caused the page fault.

Until there is not enough primary storage to store all the requested data, the process of obtaining an available page frame does not usually involve removing another page from the primary storage. If all page frames are non-empty, obtaining an available page frame requires choosing a page frame that includes data that is to be emptied. If the data in the page frame that is to be emptied has been modified since it was read into primary storage (i.e., the data is "dirty"), the dirty data must be written back to a designated location in secondary storage before the page frame in primary storage is freed. If the data in the page frame to be emptied is not dirty, the contents of the page in primary storage is the same as the contents of the page in secondary storage, and the page does not need to be written back to the secondary storage. If a reference is subsequently made to a page that was paged-out from primary storage to secondary storage, a page fault will occur, an available page frame is obtained, and the contents of the page in the secondary storage is read into the available page frame. Most MMUs use some variation of the least recently used (LRU) page replacement algorithm to select pages for replacement.

Various operating systems (e.g., Advanced Interactive eXecutive (AIX)) allow for pinning a memory region, which causes the memory region to be maintained in primary storage (e.g., random access memory (RAM)) and which prevents the memory region from being considered by the pager as a candidate for being paged-out to secondary storage (e.g., a hard disk drive (HHD)). Thus, pinning a memory region prohibits a pager from stealing pages from the pinned memory region. In most OSs, memory regions defined in either system space or user space may be pinned. When an inadequate amount of pinned memory is available, loadable modules (e.g., device drivers and/or kernel extensions) may fail to configure. As is known, when a page fault occurs in an interrupt environment or with interrupts disabled in a process environment, an associated OS may crash. To avoid page faults in an interrupt environment or with interrupts disabled in a process environment, device drivers and/or kernel extensions pin memory pages to make sure data is resident in primary storage (i.e., main memory). After a memory region is pinned, accessing the memory region does not result in a page fault.

In computing, a kernel extension (or loadable kernel module) is an object file that includes code to extend a base kernel (OS kernel). Kernel extensions are typically used to add support for new hardware, file systems, and/or system calls. When the functionality provided by a kernel extension is no longer required, the kernel extension can be unloaded from main memory in order to free memory and other resources. In computing, a device driver is a computer program that allows higher-level computer programs to interact with a hardware device. A device driver typically communicates with an associated hardware device through a computer bus or communication subsystem. When a calling program invokes a routine in a device driver, the device driver issues commands to an associated hardware device. Once the hardware device sends data back to the device driver, the device driver may invoke routines in the calling program. In general, device drivers are hardware-dependent and OS-specific. Device drivers usually provide interrupt handling required for any necessary asynchronous time-dependent hardware interface.

SUMMARY

According to one aspect of the present disclosure, a technique for managing pinned memory in a data processing system includes determining whether a first loadable module is completely utilizing pinned memory assigned to the first loadable module. In response to determining the first loadable module is not completely utilizing the pinned memory assigned to the first loadable module, the pinned memory that is not being utilized by the first loadable module is converted to kernel lock memory. In response to a second loadable module requesting pinned memory and non-kernel lock memory not being available to meet the request, one or more pages of the kernel lock memory are assigned to the second loadable module. In response to the second loadable module requesting the pinned memory and the non-kernel lock memory being available to meet the request, one or more pages of the non-kernel lock memory are assigned to the second loadable module.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 2 is an exemplary allocation record table (ART) for a loadable module (identified by a loadable module identifier/name) that includes effective addresses for pages assigned to the loadable module.

FIG. 4 is an exemplary pinned usage record table (PURT) for a loadable module that includes a loadable module identifier/name and effective addresses of free and used pinned memory pages assigned to the loadable module.

FIG. 5 is an exemplary page frame table (PFT) for a loadable module that indicates the conversion of pinned memory pages to kernel lock (klock) memory pages.

DETAILED DESCRIPTION

Figure 1:
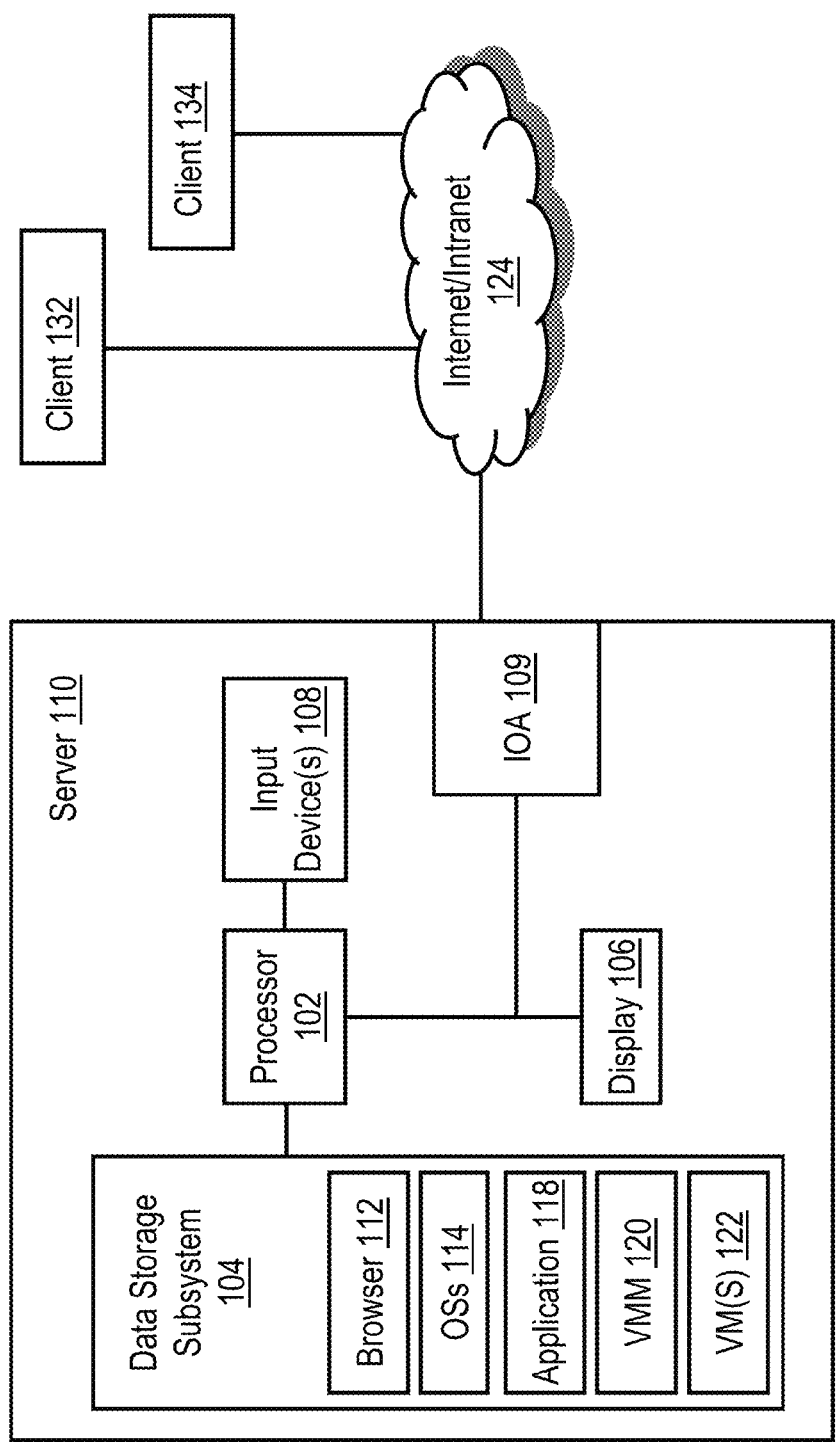
FIG. 1 is a block diagram of an example data processing environment that may be configured to manage pinned memory according to various aspects of the present disclosure.

As will be appreciated by one skilled in the art, aspects of the present invention may be embodied as a system, method, or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider (ISP)).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

In conventional data processing systems, there is no mechanism for a virtual machine monitor (VMM) or hypervisor to know if pinned memory allocated to a loadable module (e.g., a kernel extension and/or a device driver) is actually being utilized. According to various aspects of the present disclosure, techniques are implemented to allow a VMM to track whether kernel extensions and/or device drivers of kernel extensions that receive pinned memory allocations actually utilize allocated pinned memory. According to one or more disclosed embodiments, when a device driver and/or a kernel extension is determined to not be using allocated pinned memory and an OS is running out of pinned memory, a VMM converts unused pinned memory pages into kernel lock (klock) memory pages. According to at least one embodiment of the present disclosure, klock memory pages are stolen by a least recently used (LRU) daemon when no other non-klock memory pages are available to meet memory requirements of other processes.

The LRU daemon (LRUD) or LRU background program, upon stealing one or more klock memory pages, is configured to notify an associated device driver and/or kernel extension. In the event that a stolen klock memory page is needed by an associated device driver and/or kernel extension at a later point in time, the VMM may convert the stolen klock memory page back into a pinned memory page for the associated device driver and/or the kernel extension (assuming the klock memory page has not already been pinned to a new device driver and/or kernel extension).

According to the present disclosure, pinned memory pages (of unimportant or less important kernel extensions and/or device drivers that are not being referenced in an interrupts-disabled context) may eventually be converted to klock memory pages when there is high pinned memory pressure and pinned memory pages are required to accomplish a relatively important task (e.g., loading a more important kernel extension). In general, when a pinned memory page is not used in an interrupts-disabled context, the page is considered as a candidate to be converted into a klock memory page. In various embodiments, pinned memory pages that are converted to klock memory pages may be made available to a non-important kernel extension and/or a device driver in the event the non-important kernel extension and/or device driver later attempts to access the converted klock memory pages (assuming the converted klock memory pages have not been paged-out by a VMM to make room for other processes (page replacement)). Even if a converted klock memory page is paged-out, the converted klock memory page will be paged-in (with an associated page-in cost) if the converted klock memory page is accessed by an associated device driver or kernel extension in interrupts-disabled context.

According to the present disclosure, an important kernel extension or device driver may be allowed to configure even when there is shortage of pinned memory, assuming that a loaded less important kernel extension and/or device driver is not using all of its pinned memory in an interrupts-disabled context (i.e., where a page fault is not allowed). As discussed above, unused pinned memory pages (not being used in interrupts-disabled context) are converted to klock memory pages. According to the present disclosure, a pinned memory page is not converted to a klock memory page if the pinned memory page is used at least once in an interrupts-disabled context regardless of its reference time (e.g., LRU or most recently used (MRU)). In general, pinned memory pages (that are not being touched in interrupts-disabled context) of unimportant kernel extensions and/or device drivers are converted to klock memory pages, if the pinned memory pages are needed for an OS kernel to accomplish an important task.

As noted above, the converted pinned memory pages are available for use (in the form of klock memory pages), when the unimportant kernel extension and/or device driver needs them again (i.e., klock memory pages are stolen only when no other memory pages are available). Klock memory pages (which may be paged-out to a hard disk drive (HDD) in a worst case) are brought into main memory before handling an interrupt associated with an unimportant kernel extension and/or device driver. In general, any pinned memory pages that are touched once in an interrupts-disabled context are not converted to klock memory pages for a lifetime of the OS, given the assumption that the touched pinned memory pages may be required again in the interrupts-disabled context.

According to the present disclosure, pinned memory pages that are not being used in interrupts-disabled context are identified and a list of the unused pinned memory pages are maintained. When there is a just-in-time requirement in an OS to load/execute important kernel extensions and/or device drivers under high pinned memory usage pressure, unused pinned memory pages of unimportant or less important kernel extensions and/or device drivers may be converted to klock memory pages to fulfill the pinned memory page demand of the more important kernel extensions and/or device drivers.

When a load/store instruction is executed, a VMM first converts a virtual address (VA) referenced by the load/store to a real address (RA). The conversion of a VA to an RA may be stored in, for example, a translation lookaside buffer (TLB), a page table entry (PTE), or a page frame table (PFT). For example, a known page table system maintains a PFT and a page table (PT). The PFT stores information about which frames are mapped and may also store information about which address space a page belongs to, statistics information, and/or other background information. A PT generally stores mapping between a VA of a page and an RA of the page and may also store auxiliary information about the page, e.g., a present bit, a dirty or modified bit, address space, and/or process identifier (ID) information.

According to one or more embodiments, the VMM searches for the address conversion (VA to RA) in the TLB, the PTE, and/or the PFT. If the entry is already in the TLB, the PTE or the PFT, then the VMM checks the reference count for the PTE. If the reference count is already set to '1' then there is no action required. If the entry is not in the TLB, the PTE, or the PFT, then a new entry is created in the TLB, the PTE, or the PFT. For the new entry, a reference count is set to zero. For example, during allocation a virtual subnet identifier (VSID), a page number, a real page number, and a reference count may be set to 2000, 12, 102, and 0, respectively, where possible values for a page referenced during interrupts-disabled code execution are '0' and '1'. During a first reference (access) the VSID, the page number, the real page number, and the reference count may be set as follows: 2000, 12, 102, and 1, respectively. When the reference count is '0' and the reference count entry is being changed from '0' to '1' then some pinned memory page is referenced in the interrupts-disabled code and an associated special bit may be set in a current interrupt context (i.e., a virtual machine state (VMS)). When an associated interrupt handler finishes execution, before cleaning-up the current interrupt context and going back to previous interrupt context, the VMM checks as to whether the special bit of the VMS is set to '1'. If the special bit is set to '1', a new entry needs to be added in a pinned usage record table (PURT). For example, the new entry to the PURT may be added based on an ART and/or PTE entries.

A size of interrupts-disabled code (i.e., a number of instructions) may be utilized for page usage calculations. For example, assuming interrupts-disabled code includes three instructions and an OS kernel may touch some pinned memory pages, the pinned memory pages that may be touched are marked as used/referenced in the PURT. In the event that some of the pinned memory pages are not used after all three instructions are executed, the unused pinned memory pages are not being used in an interrupts-disabled context. The unused/non-referred pinned memory pages may then be converted to klock memory pages, that are only stolen by the LRUD if there are no other memory pages that can be stolen and only if the pinned memory pages are required for loading/executing more important kernel extensions and/or device drivers.

In general, the PURT may be validated by examining to what extent a page usage statistic is accurate, based on the number of instructions executed in the interrupts-disabled code. It should be appreciated that the number of pinned memory pages that are never used/referenced in interrupts-disabled code and an importance of kernel extensions and/or device drivers may change (e.g., based on user preferences). In one or more embodiments, when a load/store instruction is executed, the VMM resolves the load/store instruction (i.e., determines an RA for the VA associated with the load/store instruction) by searching entries in a TLB or a PTE, or by creating a new mapping. When the VMM determines that a reference is a first-time reference, the VMM sets a newly introduced field "Page referenced during interrupts-disabled code execution" in the current interrupt context. The VMM ignores references to pages that were previously referenced (i.e., pages for which an interrupts-disabled code execution bit is already set). If the VMM marks any page as a referenced pinned memory page in the PTE while monitoring interrupts-disabled code, the VMM sets the special bit in the VMS to indicate the page is touched.

Once the interrupt handler finishes, the clean-up routine initiates prior to returning to a previous interrupt context. If any page is newly referenced in the current interrupt context (i.e., as identified by special bit in the current context), then the VMM updates the PURT entry of the particular device driver or kernel extension. In general, the VMM is always resolving (translating addresses) for each and every access (i.e., load and/or store instructions). By referencing a current interrupt context, a VMM can identify which device driver and/or kernel extension is executing and which function (interrupt handler) is executing.

According to the present disclosure, a VMM is configured to monitor when pinned memory is actually used/referred under interrupts-disabled code (e.g., when a VMM manages the translation (TLB/PTE entries search or TLB/PTE creation for first reference)). There are several other deterministic techniques that can also be used to track pinned memory page usage if static code analysis is determined to be infeasible. For example, virtual machine (VM) verifiers may first validate user code and memory accessed by the user code that may cause problems if the user code is ran directly in an OS. The VM verifiers can be used while loading all new device drivers and/or kernel extensions to determine their pinned memory utilization.

The premise is that a memory page allocated in pinned form may be required in a particular situation, but if the page is never used in that situation (e.g., one-hundred percent of instructions in interrupts-disabled context are executed) then the page is not required in pinned form. If any kernel extension and/or device driver has requested pinned memory pages and the VMM has allocated pinned memory pages to the kernel extension and/or device driver and the kernel extension and/or device driver has not used the allocated pinned memory pages in interrupts-disabled code (even after all instructions of interrupts-disabled code are executed), then the VMM converts the unused pinned memory pages to klock memory pages so that the unused pinned memory pages can be used by other kernel extensions and/or device drivers. This conversion from pinned to klock occurs only when there is scarcity of pinned memory pages.

According to one or more aspects of the present disclosure, pinned memory pages that are not at all required by interrupt handlers (i.e., while executing interrupts-disabled code) are identified and converted from pinned memory pages to klock memory pages only if an OS has to make room for other important kernel extensions and/or device drivers that could fail to configure due to pinned memory shortage. The premise is that a pinned memory page of a less important kernel extension and/or device driver can be converted into a klock memory page if a less important kernel extension and/or device driver has not used the pinned memory page when executing interrupts-disabled code.

As one example, a kernel extension that is capturing first failure data may not be as important as a kernel extension that enables a network interface. As another example, a user may select kernel extension 'X' (which has a future pinned memory page requirement) as more important than kernel extension 'Y' (which has all pinned memory page requirements fulfilled) based on priorities of a user or a just-in-time requirement. As a different example, when an OS decides to load module 'M' (which may be a kernel extension and/or a device driver), the OS may initiate conversion of unused pinned memory pages in interrupts-disabled code of a less important kernel extension 'Z' that is already loaded. In general, the probability of performance degradation of the kernel extension 'Z' is very low as the probability its converted pages (pinned to klock) will be paged-out is negligible. For example, a database may need a kernel extension that is more important than a performance tool kernel extension or a device driver for a secondary adapter that is only used for back-ups at night.

According to the present disclosure, a VMM can validate a PURT to determine to what extent the page usage statistics are accurate, e.g., based on the number of instructions executed in interrupts-disabled code out of a total number of instructions (one-hundred percent executed, eighty percent executed and left with instructions that are not load/store instructions on pinned memory pages, thirty percent instructions executed, etc.). In general, important kernel extensions (e.g., based on customer preference and/or an OS preference), pinned memory pages of a device driver and/or kernel extension whose interrupt service routine has never been invoked, or interrupt handlers whose load/store instructions are not all executed in an interrupts-disabled context are not converted into klock memory pages.

In general, only pinned memory pages, that are not being utilized in interrupts-disabled code of unimportant kernel extensions and/or device drivers are converted to klock memory pages. Klock memory pages are only stolen if nothing else can be stolen by the LRUD and the pinned memory pressures (as contrasted with total system memory pressure) exceeds a threshold. In a usual case, the LRUD is not started when pinned memory page usage is high and system memory pressure is low (as additional system memory is available to be pinned). That is, the LRUD is only started when free system memory falls below a minimum number of free pages. For example, the LRUD may begin stealing various pages (e.g., file pages, and working segment pages) before stealing klock memory pages. As klock memory pages that are converted from pinned memory pages are marked as "pin to klock" converted pages, the LRUD may be configured to steal the converted pages only after all other normal memory pages are stolen.

According to one or more embodiments, pinned memory pages are tracked on their first reference and an accuracy of statistics collected (e.g., based on percentage of load/store instructions executed out of a total number of instructions present in interrupts-disabled code and/or a interrupt service routine) is validated. A current importance of a kernel extension to be loaded may be based on customer and/or OS priorities using a just-in-time approach. According to an embodiment of the present disclosure, allocated but never used pinned memory pages are converted to klock memory pages if pinned memory is required for an important kernel extension and/or device driver that requires execution. In general, pinned memory pages whose probability of being accessed in interrupts-disabled code is zero are converted to klock memory pages. In this manner, klock memory pages of less important kernel extensions and/or device drivers that are never used may be reassigned for the benefit of more important kernel extensions and/or device drivers.

In the case where network fault tolerance is implemented (e.g., deploying 'N' network hardware in which two are active (e.g., one primary and one backup) and two are inactive (e.g., in sleep mode) to reduce power, pinned memory usage, computational memory usage, processor usage, etc.), if a primary fails a backup assumes the responsibility of the primary, and an OS allocates pinned memory for the inactive hardware that is converted to the backup. In this situation, activating and enabling inactive network hardware to provide a backup is an important task as compared to, for example, speedy execution of a trace by a tracing subsystem that is current executing. In this case, it may be desirable to convert unused pinned memory pages that are allocated to the trace subsystem to klock memory pages to potentially provide pinned memory pages for the network hardware. Reallocating memory pages may or may not degrade the performance of the trace subsystem, as it depends on when klock memory pages are paged-out and whether tracing touches the klock memory pages before the LRUD starts. As noted above, the LRUD is usually only started during high memory usage (i.e., high memory usage is based on pinned memory page usage, working storage segment usage, file pages usage, client page usage, and klock memory pages).

As another example, hot plugging may require additional pinned memory based on new functionality added to new incoming hardware. In providing multi-vendor hot plugging support, it should be appreciated that new hardware to be installed may be from a different vendor than old hardware removed. In this case, new device drivers may need to be loaded. In general, loading all device drivers for all supported hardware types is not a good approach when only limited number of the supported hardware types will be operational. As another example, a concurrent update (hot patch) of a loadable module may require more pinned memory than the pinned memory previously assigned to the module to patched. When there are per-user group pinned usage restrictions, then classifying (e.g., very important, important, less important) kernel extensions and/or device drivers and/or applications is relatively straight forward. An importance list can be created for kernel extensions and/or device drivers based on various criteria. For example, an importance specified by a customer or decided by an OS based on priorities or just-in-time requirements (that may change from time-to-time) may be greater than system kernel extensions provided with an OS image, which may be greater than root loaded kernel extensions, which may be greater than user or group kernel extensions/applications.

Various parts of an OS kernel and/or kernel extensions may request pinned memory to avoid page-out. Moreover, device drivers, such as network drivers may request pinned memory because the network drivers are accessed inside an interrupt handler and a page-out is not possible. In general, a malicious or an unknown user (who with or without knowing the consequence of pinning memory) may request pinned memory even if the user does not need the pinned memory, i.e., the user is not accessing an interrupt handler or executing interrupts-disabled code.

As previously mentioned, unused pinned memory pages of a kernel extension and/or device driver are converted to klock memory pages only when system wide pinned memory page usage threshold limit is crossed. According to one or more embodiments, not all unused pinned memory pages are unpinned. In general, the amount of pinned memory converted to klock memory is based on new pinned memory demands. As one example, assuming an eighty pinned memory page threshold and eighty-eight pinned memory pages allocated, if a new device driver requests ten pinned memory pages, then eighteen pinned memory pages may be converted to klock memory pages to make room for the request (e.g., a super user wants to load an important kernel extension that previously failed due to unavailability of pinned memory pages).

Which pinned memory pages are converted into klock memory pages may depend on various factors. For example, pinned memory pages for loadable modules that have been running for a relatively long period of time with no user requests, no registered interrupt handlers executed, and no pages touched may be converted first. For example, assume three device drivers (i.e., DD1, DD2, and DD3) are loaded and DD1 is using thirty pinned memory pages, DD2 is using thirty pinned memory pages, and DD3 is using twenty pinned memory pages. Assuming DD1 and DD3 are accessed more frequently than DD2, the VMM would usually select the DD2 pinned memory pages for klock conversion. In this case, eighteen pinned memory pages of DD2 are converted into klock memory pages (assuming the eighteen pages have not been used in interrupts-disabled code or by an interrupt handler).

The converted klock memory pages (pinned to klock) may be re-pinned if OS usage of pinned memory pages drops to a lower threshold (e.g., as other kernel extensions and/or device drivers are unloaded). When a pinned memory page is converted to a klock memory page, the LRUD then steals the klock memory pages when nothing else can be stolen. Between klock memory pages, a special bit or bits may be set to cause the LRUD to steal designated klock memory pages at the end when all other klock memory pages are consumed. In this manner, it can be ensured that klock memory pages are swapped out only when all pages in memory are being used. In one or more embodiments, a pinned memory page threshold limit can be set by a user and/or administrator. In at least one embodiment, a set threshold limit can be turned off by setting the threshold to one-hundred percent. In at least one embodiment, more weight is given to klock memory pages that are "paged-in" before initiating an interrupt handler or pages of frequently accessed devices (based on user request frequency, handler invocation frequency, user request forecast, etc.) so that those pages are not paged-out in the near future.

In one or more embodiments before an interrupt handler starts executing, the interrupt handler employs a predictive approach to determine what pinned memory pages will be accessed in an interrupts-disabled context at runtime. For example, if an interrupt is for packets received, a device driver knows how many packets are received (based on receiver (RX) descriptor information) to be processed in the interrupt context and what other data structure will be accessed in the interrupt context. Based on known information, the device driver checks to see if the predicted address is in memory (e.g., using a data structure that maintains a list of addresses that are converted to klock memory pages, as well as which klock memory pages are swapped-out to a HDD). If any of the addresses are in the swapped address list, the device driver marks a "need" bit for that address and returns from the interrupt handler (so that an adapter issues another interrupt). The next time the interrupt is scheduled, before starting the second level interrupt handler (SLIH) if a "need" bit is set on any of the swapped out pages, the VMM retrieves the pages and then invokes the SLIH. In this case, the SLIH delay only occurs when a page the VMM needs is not in memory.

Currently, device drivers are already keeping track of pinned memory page usage. Along with tracking pinned memory page usage, the device driver can also maintain a list of all pages (or effective addresses) that were converted from pinned to klock memory pages, but that are still not stolen by an LRUD (i.e., pages that are still owned by the device driver). The device driver can also maintain another list to track pages stolen by the LRUD (i.e., pages that are no longer owned by the device driver). When an interrupt handler is being scheduled and a page is found to be swapped-out (based on a lookup in the two lists), a "page-in and preparation" routine of the VMM can be executed to swap-in the page before invoking the interrupt handler. This ensures a page is in memory before an interrupt handler is scheduled and is not stolen by the LRUD until the interrupt handler completes. Once the interrupt handler completes, the "page-in and preparation" routine, the VMM can pin a klock memory page (which was newly touched during interrupt handler execution) if a pinned memory usage count is below the threshold and then make all klock memory pages available for the LRUD.

With reference to FIG. 1, an example data processing environment 100 is illustrated that includes a server 110 (e.g., a file server and/or a web page server) that is in communication with clients 132 and 134, via Internet/Intranet 124. Clients 132 and 134 may take various forms, such as workstations, laptop computer systems, notebook computer systems, smart phones, web-enabled portable devices, or desktop computer systems. For example, client 132 may correspond to a desktop computer system of a computer system user and client 134 may correspond to a web-enabled device of another computer system user.

Server 110 includes a processor 102 (which may include one or more processor cores for executing program code) coupled to a data storage subsystem 104, a display 106 (e.g., a cathode ray tube (CRT) or a liquid crystal display (LCD)), one or more input devices 108 (e.g., a mouse, a keyboard, haptic devices, and/or a touch screen), and an input/output adapter (IOA) 109. IOA 109, which supports communication of server 110 with one or more wired and/or wireless networks 124 utilizing one or more communication protocols, such as 802.x, hyper text transfer protocol (HTTP), simple mail transfer protocol (SMTP), etc., may be virtualized as: a Fibre Channel (FC) adapter, a small computer system interface (SCSI) adapter, an Internet SCSI (iSCSI) adapter, or an InfiniBand (IB) adapter, among other adapters. Data storage subsystem 104 may include, for example, an application appropriate amount of volatile memory (e.g., dynamic random access memory (DRAM)), non-volatile memory (e.g., read-only memory (ROM) or static RAM), and/or non-volatile mass storage device, such as a magnetic or optical disk drive.

Data storage subsystem 104 includes a plurality of possibly diverse operating systems (OSs) 114 for various virtual machines (VMs) 122 implemented within server 110, a virtual machine monitor (VMM) 120 for allocating resources of server 110 among VMs 122 and controlling the execution VMs 122, and various applications that may be executed by VMs 122. These applications may include, for example, an email application, a word processing application, a presentation application, a spreadsheet application (collectively illustrated at reference numeral 118), as well as a browser 112 (which may optionally include customized plug-ins to support various client applications). As is discussed in further detail below, VMM 120 is configured to manage pinned memory for loadable modules (e.g., device drivers and/or kernel extension) for VMs 122 according to the present disclosure.

Advantageously, the disclosed techniques facilitate improved management of pinned memory pages and may help to minimize memory thrashing under high pinned memory load, e.g., when at least some pinned memory pages are not being utilized by an associated device driver and/or associated kernel extension. According to one or more aspects of the present disclosure, techniques are disclosed that detect when a maximum pinned memory page threshold is reached (e.g., eighty percent of a total OS acceptable pinned memory usage) for code that is executing with hardware interrupts-disabled or in another processor execution level that does not allow processor generated exceptions (e.g., when page faults are not allowed). When the maximum pinned memory page threshold is reached, unused pinned memory pages may be converted to kernel lock (klock) memory pages. For example, a new kernel variable (e.g., max_pinned_page_threshold) that defines a maximum pinned memory threshold may be maintained as part of VMM global data.

According to one or more aspects of the present disclosure, all pinned memory pages (effective address and range/number of pages) requested by a particular device driver and/or kernel extension are maintained in a data structure, e.g., an allocation record table (ART). An exemplary device driver code snippet in which a device driver has requested a total of six pinned memory pages is illustrated as follows:

```
{
        pin request(FFFF__1100, 4k*3)
        pin request(FFFF__6200, 4k*3)
    i__disable (interrupts-disabled context)
        referenced effective addresses FFFF__1100, FFFF__2100,
        and FFFF__6200
    IF(condition)
        referenced effective address FFFF__7200
        i__enable (enable interrupt)
}
```

In the device driver code snippet set forth above, a first pinned memory request is from effective address FFFF__1100 for three pages and a second pinned memory request is from effective address FFFF__6200 for three pages. As is illustrated, the device driver is only accessing a part of pinned memory (i.e., effective addresses FFFF__1100, FFFF__2100, and FFFF__6200) in the interrupts-disabled context. Moreover, another portion of pinned memory (i.e., effective address FFFF__7200) is only referenced during a designated condition.

With reference to FIG. 2, an allocation record table (ART) 200 for the above device driver code snippet is illustrated. According to ART 200, the device driver requested six pinned memory pages of size 4K with the illustrated effective addresses and ranges. From ART 200, a VMM can calculate a maximum pinned memory requested by the device driver which is a sum of the page lengths in ART 200, i.e., six pages of size 4K. It should be appreciated that an ART of a first device driver may be linked with an ART of a second device driver to form an ART linked list, with the linked list being traversed to find an ART for a desired device driver.

Figure 3:
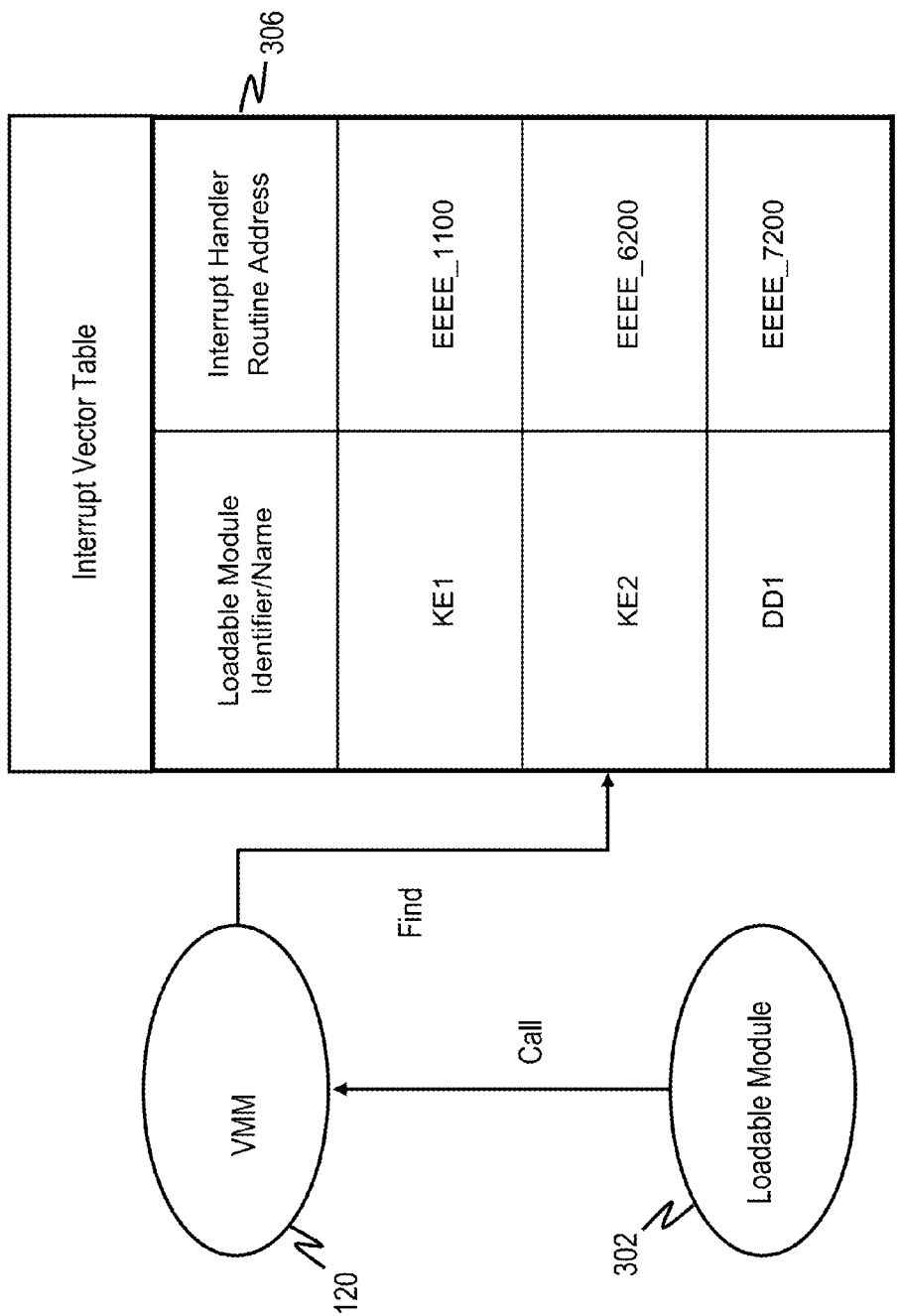
FIG. 3 is a diagram that depicts an interaction between a virtual machine monitor (VMM) and an exemplary interrupt vector table (IVT) that includes loadable module identifiers/names and respective addresses for associated interrupt handlers.

According to one or more embodiments of the present disclosure and with reference to FIG. 3, when a loadable module (e.g., a device driver and/or kernel extension) 302 registers its interrupt handler with VMM 120 (e.g., using an interrupt initialization service call), VMM 120 saves the information in another data structure (e.g., an interrupt vector table (IVT) 306) based on an interrupt priority level. As is illustrated in FIG. 3, two kernel extensions (KE1 and KE2)

and one device driver (DD1) having interrupt routine effective addresses of EEEE_1100, EEEE_6200, and EEEE_7200, respectively, are stored in IVT 306. In one or more embodiments, an identifier (ID) or name of a device driver and/or kernel extension that invoked the interrupt initialization service (to register their interrupt handlers) may be saved in conjunction with the pinned memory information to establish an association between the device driver ID and/or kernel extension ID and the interrupt handler. It should be appreciated that the information in ART 200 and IVT 306 may be stored in a single data structure.

In at least one embodiment, when an VMM 120 chooses a new interrupt for servicing, an old context is saved in a current virtual machine state (VMS) and a new VMS is created for the new interrupt. In one or more embodiments, VMM 120 runs a first level interrupt handler (FLIH) to identify the new interrupt, retrieves an IVT entry for the identified interrupt, and runs the interrupt handler specified in the IVT entry. For example, device driver and/or kernel extension IDs (associated with an interrupt handler in an IVT) may be saved as part of the VMS. Saving the IDs in the VMS facilitates identifying the PURT and ART and may be utilized to add TLB, PTE, or PFT entries to a PURT of a specific device.

In one or more embodiments and with reference to FIG. 4, all pinned memory pages referenced in the VMS are stored in another data structure (e.g., a pinned usage record table (PURT) 400) of a particular device driver and/or kernel extension by a virtual memory mapping module (not separately shown) of VMM 120 (e.g., during translation of an effective address (EA) to a real address (RA)). As is illustrated, PURT 400 includes information relevant to the above code snippet. Specifically, in PURT 400 effective addresses FFFF_1100, FFFF_2100, and FFFF_6200, are indicated as being used and effective addresses FFFF_3100, FFFF_7200, and FFFF_8200 are indicated as being free after the code snipped has executed in interrupts-disabled context. According to another aspect, each effective address that is free includes an indication of age, such that pinned memory pages with effective addresses that are free for a longer time period may be selected for conversion to klock memory pages prior to younger pinned memory pages that are free. It should be appreciated that a PURT of a device may be linked with a PURT of another device to form a PURT linked list, with the linked list being traversed to find a PURT for a desired device driver.

According to one or more embodiments, a minimum pin request, which corresponds to a minimum amount of pinned memory pages that will always be available for a device driver and/or kernel extension at any point in time, is determined Pseudo code for modifying a PURT may be constructed as follows:

```
if (max_pinned_page_threshold reached && execution environment
does not allow page fault)
//int_pri in VMS indicates that page faults are disallowed//
{
get device identifier from the my_vms( )
//search the linked list of PURT to get the PURT of specific device
driver/kernel extension//
push address to which the translation is required into proper entry in
PURT
}
```

In one or more embodiments, when the number of pinned memory pages is greater than a threshold (max_pinned_page_threshold), then for every free pinned memory page that is in the PURT for each device driver and/or kernel extension, a pinned designator for free pinned pages is changed from '1' to '0' and a klock designator is changed from '0' to '1', i.e., the pinned memory pages are changed to klock memory pages.

With reference to FIG. 5, a page frame table (PFT) 500 for the device driver code snipped above is illustrated. As is shown, PFT 500 includes effective addresses FFFF_3100, FFFF_7200, and FFFF_8200 which are unpinned and converted to klock memory pages, as the pinned memory pages are not referenced inside interrupts-disabled code. According to another aspect, a designated age (see FIG. 4) is implemented for indicating newly formed klock memory pages. In this case, the newly formed klock memory pages are only stolen by the LRUD when other older klock memory pages are exhausted. According to one or more embodiments, when an OS is running out of pinned memory, a status of a page that is not in use (e.g., according to an ATR 200) may be changed from pinned to klock (pinned: 1→0 and klock: 0→1).

Figure 6:
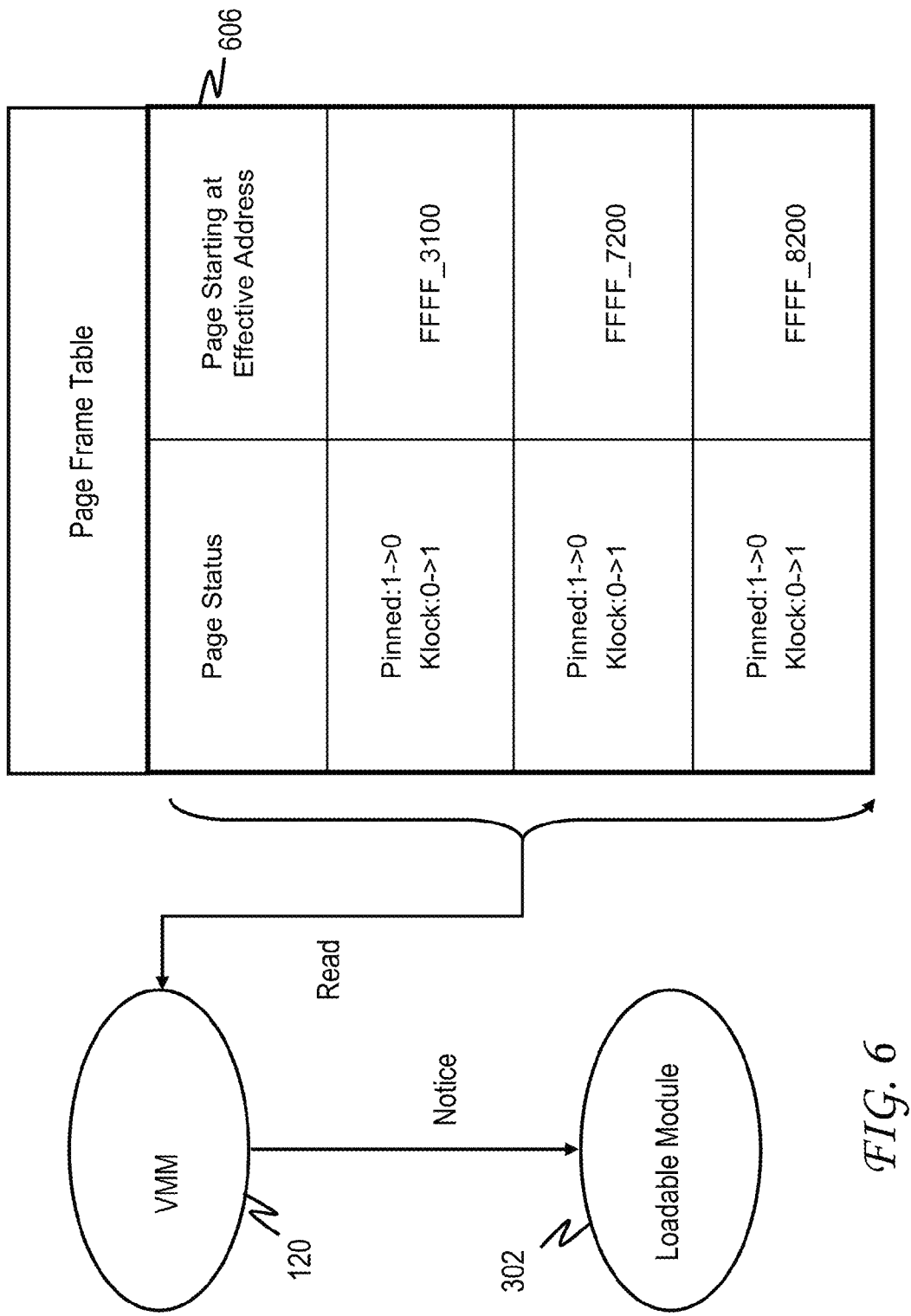
FIG. 6 is a diagram that depicts a read interaction between a VMM and an exemplary PFT of a loadable module that indicates the conversion of pinned memory pages to klock memory pages.
Figure 7:
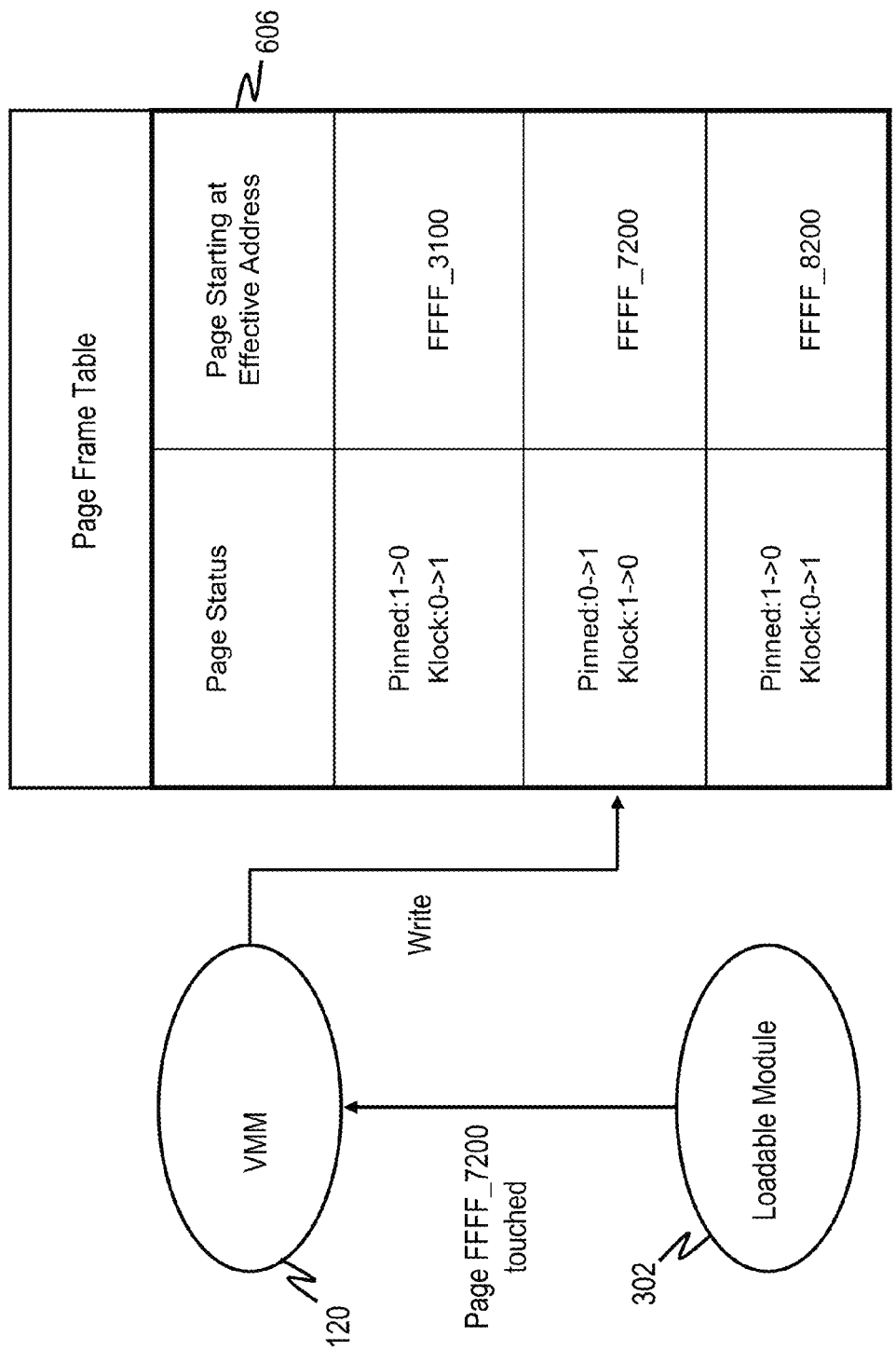
FIG. 7 is a diagram that depicts a write interaction between a VMM and an exemplary PFT of a loadable module that indicates the conversion of a klock memory page to a pinned memory page.

In one or more embodiments and with reference to FIG. 6, once a page status has been changed to klock and unpinned by VMM 120, a page status change notification is sent from VMM 120 to an associated loadable module 302. In one or more embodiments, a device driver and/or kernel extension is configured to register a handler with an OS kernel (via VMM 120) for a page status change notification. Based on usage of associated memory pages in an interrupt context due to some condition, the device driver and/or kernel extension may request re-pinning of the associated memory pages. For example, once a page has been unpinned and a klock bit is set (see page frame table 606, which maintains a list of non-empty pages), if the device driver and/or kernel extension accesses the memory again in the interrupt context due to some condition, then the effective address (e.g., FFFF_7200 in the example herein) is referred and recorded in PURT 400. With reference to FIG. 7, the page at effective address FFFF_7200 is illustrated as being touched and, as such, the page is pinned again, a pinned status is set in PFT 606 to '1', and a klock status is set to '0'.

According to another aspect of the present disclosure, an age for each of the free entries in a PURT is designated. In this case, when a page is accessed in an interrupt context based on some condition and an entry is found in the PURT indicating the page is free, an age for the entry can be reset to zero. For other PURT entries that that were not accessed in an interrupt context based on the condition, an age for the entries can be incremented. Once an age reaches a threshold (which can be defined by user) the entry can be removed from PURT and the pinned memory page can be marked as a klock memory page, as described above. For example, when a pinned memory page is only accessed once based on a condition and a device driver and/or kernel extension never accesses the pinned memory page again, the pinned memory page may eventually be marked as a klock memory page.

Figure 8:
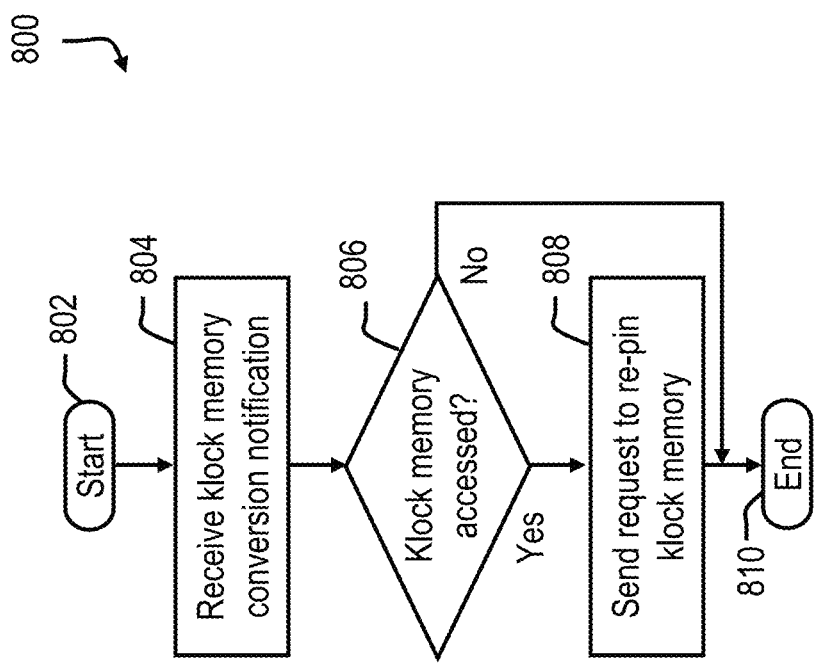
FIG. 8 is a flowchart of an example interaction between a loadable module and a VMM.

With reference to FIG. 8, an exemplary process 800 is illustrated that is implemented by a loadable module (e.g., a device driver and/or a kernel extension). Process 800 may, for example, execute on processor 102 of server 110. In block 802 process 800 is initiated (e.g., in response to loadable module 302 (see FIG. 6) receiving a communication), at which point control transfers to block 804. In block 804, loadable module 302 receives a notification (from VMM 120) that one or more pages of associated pinned memory have been converted to klock memory. Next, in decision block 806, module 302 determines whether the one or more pages of the klock memory have been accessed in an interrupts-disabled context or in an interrupt mode based on a condition. In response to one or more pages of the klock memory being accessed in block 806, control transfers to block 808. In block 808, module 302 sends a communication to VMM 120 requesting that the accessed klock memory be returned to pinned memory (see FIG. 7). Following block 808 control transfers to block 810, where process 800 terminates. In response to one or more pages of the klock memory not being accessed in block 806, control transfers to block 810.

Figure 9:
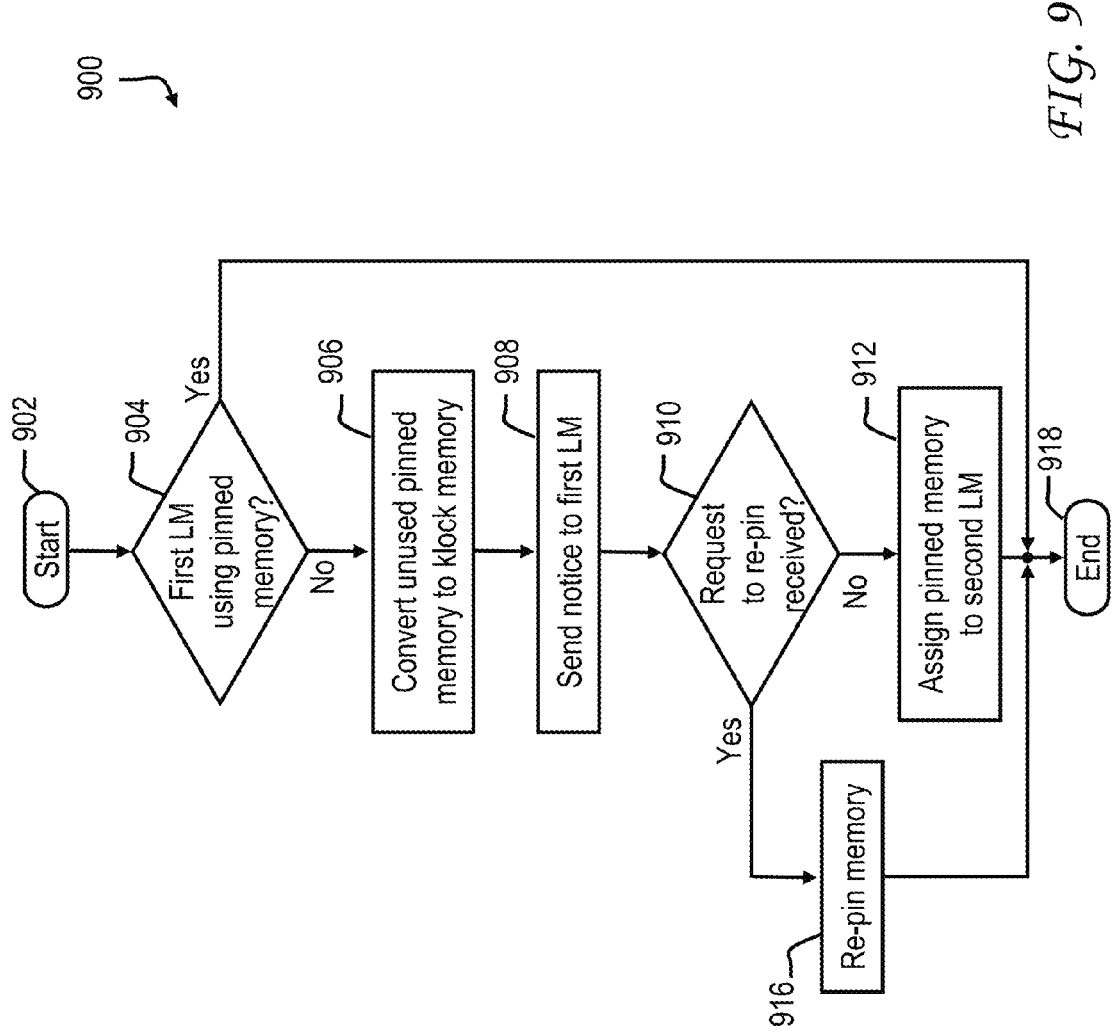
FIG. 9 is a flowchart of an example virtual machine monitor (VMM) process for managing pinned memory according to various aspects of the present disclosure.

With reference to FIG. 9, an exemplary virtual machine monitor (VMM) process 900 for managing pinned memory, according to various aspects of the present disclosure, is illustrated. Process 900 may be, for example, initiated in response to a loadable module (LM), e.g., a relatively important device driver or kernel extension, requesting pinned memory and non-kernel lock memory (e.g., file pages and working segment pages) not being available to meet the request. Process 900 may, for example, execute on processor 102 of server 110. In decision block 904, VMM 120 determines whether a first LM (e.g., a device driver or a kernel extension having a lower level priority than the loadable module requesting pinned memory) is completely utilizing assigned pinned memory. In response to determining the first LM is not completely utilizing the assigned pinned memory in block 904, control transfers to block 906 where VMM 120 converts the pinned memory that is not being utilized by the first LM to kernel lock (klock) memory.

Next, in block 908, VMM 120 generates a notification to the first LM in response to one or more pages of the pinned memory assigned to the first LM being converted to klock memory, as described above with reference to block 804. Then, in decision block 910, VMM 120 determines whether a request to reinstate the pinned memory that was converted to klock memory has been received from the first LM, as described above with reference to block 808. In response to VMM 120 receiving a reinstatement request from the first LM, control transfers to block 916, where VMM 120 converts the one or more pages of the pinned memory converted to the klock memory back to the pinned memory for the first LM.

It should be appreciated that when the klock memory is re-pinned another LM may be selected when process 900 is reinitiated by VMM 120. In response to VMM 120 not receiving a reinstatement request from the first LM within an predetermined time frame, control transfers to block 912. In block 912, one or more pages of the kernel lock memory are assigned to a second LM, i.e., the loadable module that requested the pinned memory pages. Following blocks 916 and 912 control transfers to block 918, where the process 900 terminates.

Accordingly, techniques have been disclosed herein that advantageously manage pinned memory of a data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of managing pinned memory in a data processing system, comprising:

determining, by a processor executing on the data processing system, whether a first loadable module is utilizing each page of a plurality of pinned pages in a first pinned memory that is assigned to the first loadable module, wherein any pages within a pinned memory assigned to a particular loadable module are prohibited from being used by another loadable module;

in response to determining the first loadable module is not utilizing each page of the plurality of pinned pages in the first pinned memory, converting, by the processor, one or more pinned pages of the plurality of pinned pages in the first pinned memory that are not being utilized by the first loadable module to one or more kernel lock (klock) pages, wherein the one or more pinned pages are currently not in use by the first loadable module and have never been utilized by an operating system in an interrupts-disabled context, and wherein the one or more klock pages are pages in memory that are available for use by another loadable module when no other non-klock pages are available to meet memory requirements of the other loadable module;

in response to receiving a request to assign a second pinned memory to a second loadable module and there not being enough available pages non-klock klock memory to meet the request, assigning, by the processor, one or more pages of the klock memory to the second pinned memory; and in response to receiving the request to assign the second pinned memory to the second loadable module and there being enough available non-klock klock memory to meet the request, assigning, by the processor, one or more pages of the non-klock kernel lock memory to the second pinned memory.

2. The method of claim 1, further comprising:
in response to converting the one or more pages of the plurality of pinned pages to the one or more klock pages, generating a notification to the first loadable module;
in response to the first loadable module requesting reinstatement of the plurality of pinned pages in response to the notification, converting the converted one or more klock pages back to the one or more pinned pages in the first pinned memory;
in response to the converted one or more klock pages being assigned to the second pinned memory, generating a notification to the first loadable module.

3. The method of claim 1, further comprising:
registering, by the first and second loadable modules, a respective first and second interrupt handlers with an operating system kernel; and
storing pinned memory assignments for the first and second loadable modules in a data structure, wherein the data structure further includes respective identifiers and respective interrupt handlers for the first and second loadable modules and respective indicators that correspond to ages of klock pages associated with the first and second loadable modules.

4. The method of claim 1, wherein the first and second loadable modules are different device drivers, different kernel extensions, a device driver and a kernel extension, or a kernel extension and a device driver.

5. The method of claim 1, wherein the first and second loadable modules execute in the interrupts-disabled context, wherein page faults are not allowed in the interrupts-disabled context, and wherein pages that have been used in the interrupts-disabled context are marked.

6. The method of claim 1, wherein the non-klock memory includes file pages and working segment pages.

7. The method of claim 1, wherein the determining whether a first loadable module is utilizing each page of the plurality of pinned pages in the first pinned memory is performed responsive determining the operating system is approaching a total allocated pinned system memory threshold.

8. The method of claim 1, wherein the interrupts-disabled context is a context where page faults are not allowed, wherein a pinned memory page cannot be converted to a klock memory page if the pinned memory page has been used at least once in an interrupts-disabled code during the lifetime of the operating system.

9. A computer program product, comprising:
a non-transitory computer-readable storage medium; and
computer-readable code for managing pinned memory in a data processing system embodied on the non-transitory computer-readable storage medium, wherein the computer-readable code, when executed by a processor of the data processing system, causes the processor to:
determine whether a first loadable module is utilizing each page of a plurality of pinned pages in a first pinned memory that is assigned to the first loadable module, wherein any pages within a pinned memory assigned to a particular loadable module are prohibited from being used by another loadable module;
in response to determining the first loadable module is not utilizing each page of the plurality of pinned pages in the first pinned memory, convert one or more pinned pages of the plurality of pinned pages in the first pinned memory that are not being utilized by the first loadable module to one or more kernel lock (klock) pages, wherein the one or more pinned pages are currently not in use by the first loadable module and have never been utilized by an operating system in an interrupts-disabled context, and wherein the one or more klock pages are pages in memory that are available for use by another loadable module when no other non-klock pages are available to meet memory requirements of the other loadable module;
in response to receiving a request to assign a second pinned memory to a second loadable module and there not being enough available pages non-klock memory to meet the request, assign one or more pages of the klock memory to the second pinned memory; and
in response to receiving the request to assign the second pinned memory to the second loadable module and there being enough available non-klock memory to meet the request, assign one or more pages of the non-klock kernel lock memory to the second pinned memory.

10. The computer program product of claim 9, wherein the computer-readable code, when executed by the processor of the data processing system, further causes the processor to:
in response to converting the one or more pages of the plurality of pinned pages to the one or more klock pages, generate a notification to the first loadable module;
in response to the first loadable module requesting reinstatement of the plurality of pinned pages in response to the notification, convert the converted one or more klock pages back to one or more pinned pages in the first pinned memory; and
in response to the converted one or more klock pages being assigned to the second pinned memory, generate a notification to the first loadable module.

11. The computer program product of claim 9, wherein the computer-readable code, when executed by the processor of the data processing system, further causes the processor to:
register, by the first and second loadable modules, a respective first and second interrupt handlers with an operating system kernel; and
store pinned memory assignments for the first and second loadable modules in a data structure, wherein the data structure further includes respective identifiers and respective interrupt handlers for the first and second loadable modules and respective indicators that correspond to ages of klock pages associated with the first and second loadable modules.

12. The computer program product of claim 9, wherein the first and second loadable modules are different device drivers, different kernel extensions, a device driver and a kernel extension, or a kernel extension and a device driver, wherein the first and second loadable modules execute in the interrupts-disabled context, wherein page faults are not allowed in the interrupts-disabled context, wherein pages that have been used in the interrupts-disabled context are marked, where the non-kernel lock memory includes file pages and working segment pages, and where the determining whether a first loadable module is utilizing each page of the plurality of pinned pages in the first pinned memory is performed responsive to determining the operating system is approaching a total allocated pinned system memory threshold.

13. The computer program product of claim 9, wherein the interrupts-disabled context is a context where page faults are not allowed, wherein a pinned memory page cannot be converted to a klock memory page if the pinned memory page has been used at least once in an interrupts-disabled code during the lifetime of the operating system.

14. A data processing system, comprising:
a memory system; and
a processor coupled to the memory system, wherein the processor is configured to:
   determine whether a first loadable module is utilizing each page of a plurality of pinned pages in a first pinned memory that is assigned to the first loadable module, wherein any pages within a pinned memory assigned to a particular loadable module are prohibited from being used by another loadable module;
   in response to determining the first loadable module is not utilizing each page of the plurality of pinned pages in the first pinned memory, convert one or more pinned pages of the plurality of pinned pages in the first pinned memory that are not being utilized by the first loadable module to one or more kernel lock (klock) pages, wherein the one or more pinned pages are currently not in use by the first loadable module and have never been utilized by an operating system in an interrupts-disabled context, and wherein the one or more klock pages are pages in memory that are available for use by another loadable module when no other non-klock pages are available to meet memory requirements of the other loadable module;
   in response to receiving a request to assign a second pinned memory to a second loadable module and there not being enough available pages non-klock memory to meet the request, assign one or more pages of the klock memory to the second pinned memory; and
   in response to receiving the request to assign the second pinned memory to the second loadable module and there being enough available non-klock memory to meet the request, assign one or more pages of the non-klock kernel lock memory to the second pinned memory.

15. The data processing system of claim 14, wherein the processor is further configured to:
   in response to converting the one or more pages of the plurality of pinned pages to the one or more klock pages, generate a notification to the first loadable module;
   in response to the first loadable module requesting reinstatement of the plurality of pinned pages in response to the notification, convert the converted one or more klock pages back to one or more pinned pages in the first pinned memory; and
   in response to the converted one or more klock pages being assigned to the second pinned memory, generate a notification to the first loadable module.

16. The data processing system of claim 14, wherein the computer-readable code, when executed by the processor of the data processing system, further causes the processor to:
   register, by the first and second loadable modules, a respective first and second interrupt handlers with an operating system kernel; and
   store pinned memory assignments for the first and second loadable modules in a data structure, wherein the data structure further includes respective identifiers and respective interrupt handlers for the first and second loadable modules and respective indicators that correspond to ages of klock pages associated with the first and second loadable modules.

17. The data processing system of claim 14, wherein the interrupts-disabled context is a context where page faults are not allowed, wherein a pinned memory page cannot be converted to a klock memory page if the pinned memory page has been used at least once in an interrupts-disabled code during the lifetime of the operating system.

18. The data processing system of claim 14, wherein the first and second loadable modules are different device drivers, different kernel extensions, a device driver and a kernel extension, or a kernel extension and a device driver.

19. The data processing system of claim 14, wherein the first and second loadable modules execute in the interrupts-disabled context, wherein page faults are not allowed in the interrupts-disabled context, and wherein pages that have been used in the interrupts-disabled context are marked.

20. The data processing system of claim 14, wherein the non-klock memory includes file pages and working segment pages, and wherein the determining whether a first loadable module is utilizing each page of the plurality of pinned pages in the first pinned memory is performed responsive to determining the operating system is approaching a total allocated pinned system memory threshold.

* * * * *